United States Patent

[11] 3,607,140

| [72] | Inventors | Frank E. Miller<br>Caseyville, Ill.;<br>James L. Martine, Dalkeith, Australia |
|---|---|---|
| [21] | Appl. No. | 777,113 |
| [22] | Filed | Nov. 19, 1968 |
| [45] | Patented | Sept. 21, 1971 |
| [73] | Assignee | Aluminum Company of America<br>Pittsburgh, Pa. |

[54] PREPARATION OF ALUMINA OF IMPROVED PURITY BY IRON REMOVAL
15 Claims, 1 Drawing Fig.

[52] U.S. Cl. ............................................ 23/301 R,
23/305, 23/143, 23/299
[51] Int. Cl. .............................................. B01d 9/02,
C01f 7/14
[50] Field of Search ........................................... 23/301,
143, 299, 301, 305

[56] References Cited
UNITED STATES PATENTS
2,653,858  9/1953  Brown .......................... 23/305

| 2,935,376 | 5/1960 | Roberts, Jr. ................ | 23/305 |
|---|---|---|---|
| 3,148,024 | 9/1964 | Hayes et al. ................. | 23/305 |
| 3,216,794 | 10/1965 | Roschuk ....................... | 23/305 |
| 3,265,466 | 8/1966 | Mollard ........................ | 23/305 |
| 1,953,201 | 4/1934 | Tosterud ...................... | 23/143 |
| 2,657,978 | 11/1953 | Johnson ....................... | 23/301 |
| 2,707,669 | 5/1955 | Houston et al. ............... | 23/143 |
| 3,486,850 | 12/1969 | Day ............................. | 23/143 |

FOREIGN PATENTS
799,243  8/1958  Great Britain ................  23/305

Primary Examiner—Norman Yudkoff
Assistant Examiner—R. T. Foster
Attorney—Abram W. Hatcher ABSTRACT: Continuous seeding of a flowing stream of sodium aluminate and with alumina hydrate to precipitate a limited amount of alumina hydrate which carries with it most of any iron and other impurities contained in said stream. The process results in an alumina of improved purity subsequently precipitated from said stream.

PATENTED SEP 21 1971 3,607,140
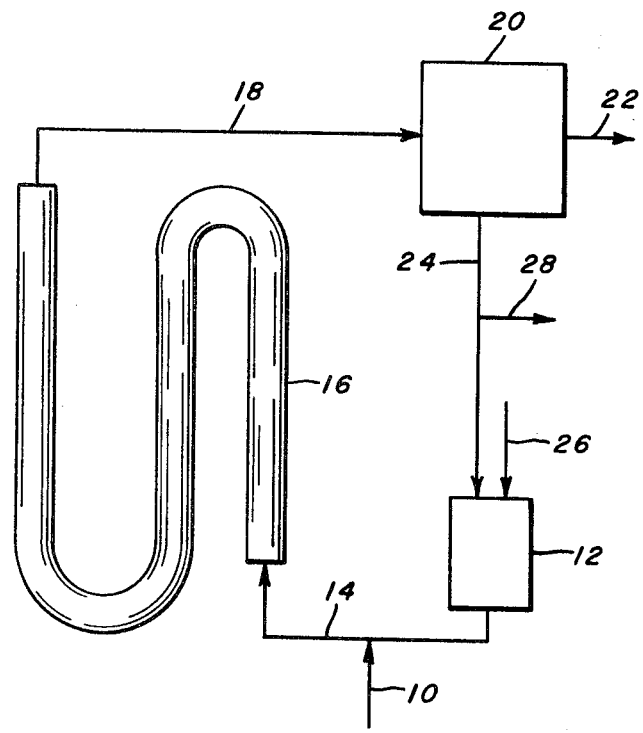
INVENTORS.
JAMES L. MARTINE, JR. &
FRANK E. MILLER
By Abram H. Hatcher
Attorney

PREPARATION OF ALUMINA OF IMPROVED PURITY BY IRON REMOVAL

BACKGROUND OF THE INVENTION

This invention relates to purification of sodium aluminate liquor such as that obtained by treatment of bauxite or other alumina source. More particularly, it relates to a continuous method of removing iron and other impurities from such sodium aluminate liquor.

It is conventional to produce alumina ($Al_2O_3$) by such well-known methods as the Bayer process (caustic digestion), the soda-lime sinter process and the "combination process," which combines the preceding two. Such alumina must be of high purity whether used for electrolytic production of aluminum or for abrasive, ceramic, or like uses. To obtain alumina of the required purity, it is necessary to reduce the content of iron and other contaminants such as magnesium, zinc and calcium, often in the form of oxides, which are carried along from the bauxite or other source or from the reagents used into the sodium aluminate liquor formed in treatment of the bauxite or other alumina source according to the aforementioned methods.

One system for removing such impurities has been proposed by British Pat. No. 799,243. According to this patent a two-stage process is used for precipitating the alumina hydrate from the sodium aluminate liquor or solution. In the first step seed alumina hydrate is added in a small amount to precipitate a small percentage of the hydrate, this small percentage containing most of the iron and other impurities which it is desired to remove. In the second stage the alumina hydrate is precipitated either by seeding or by precipitation with carbon dioxide, thus achieving a substantially pure hydrate.

One difficulty which has been encountered in trying to use the method of the British patent for removing the iron and other impurities is the necessity for use of a large vessel for the preliminary precipitation step. Another is the time (for example, up to 12 hours) required for filling the vessel, precipitating the alumina hydrate (which carries with it the iron), and lengthy decanting. In using such a process, the amount of alumina hydrate precipitated from the sodium aluminate is largely uncontrolled. An additional consequence of the lengthy holding period and small amount of seed used according to the above-mentioned British patent is that a considerable amount of alumina trihydrate is deposited from the solution on the sidewalls of the precipitator tank as scale. Frequent and expensive cleaning of the tank is required to remove such scale. Furthermore, limiting the amount of seed charge into the tank has failed to control scale formation and hydrate precipitation adequately as desired. Therefore, development of a system which will remove most of the iron from sodium aluminate liquor without requiring a long holding time and will also permit control of the amount of alumina hydrate precipitated represents a highly desirable result.

SUMMARY OF THE INVENTION

It is accordingly one object of this invention to provide an improved method for removing iron and other impurities from sodium aluminate liquor and, as a result, precipitating from the liquor an alumina of improved purity. It is another object of this invention to provide a system for reducing the content of iron and other contaminants in aluminate liquors. By iron we means iron in any form in which it may be present, for example, as $Fe_2O_3$, iron oxide hydrate or other compound form, or whether in dissolved or colloidal form. Further objects will be apparent hereinafter from the description and claims which follow.

Our invention is predicated upon the discovery that by contacting seed alumina hydrate, either dry or in a slurry, under closely controlled conditions with a moving stream of sodium aluminate liquor containing sufficient alumina ($Al_2O_3$) to be precipitated as alumina hydrate (principally $Al_2O_3 \cdot 3H_2O$) by seeding, most of the iron and other impurities may be carried down as a part of a mineral amount of a contaminated alumina hydrate precipitation. This may be done while employing only a short liquor holding time, preferably 5–30 minutes, and most preferably 10–20 minutes. By liquor holding time we mean time between introduction of seed hydrate to a portion of the flowing stream of sodium aluminate liquor and separation of precipitated alumina hydrate therefrom. Our process may be operated continuously. The content of alumina is typically represented in terms of the $Al_2O_3$:total caustic (TC) ratio. The total caustic (TC) represents the $Na_2CO_3$ equivalent of total sodium hydroxide present, including that combined with the alumina in the sodium aluminate liquor. The $Al_2O_3$:TC ratio of the sodium aluminate treated according to our invention may range preferably anywhere from 0.3:1 to 0.8:1.

The alumina hydrate contacted with the moving stream of sodium aluminate liquor must be of sufficient surface area per given volume of liquor to bring about the desired precipitation. We have found this to be most desirably from 1 to 20, preferably from 3 to 10 square meters per liter ($m^2/l.$) of the stream of sodium aluminate liquor. One method of calculating surface area is by using principles such as those of the well-known BET method, which is based upon gas sorption as laid down by S. Brunauer, P. H. Emmett and E. Teller in J. Am. Chem. Soc., Vol. 60, pp. 309–319 (1938). The desired amount of surface area may be obtained either by using a small quantity of very fine alumina hydrate or a larger quantity of coarse alumina hydrate. We prefer that the temperature of the moving stream of sodium aluminate liquor be 150°–225° F.

It is essential according to our invention that there be very little, that is, substantially no, longitudinal mixing of the added alumina hydrate with the moving sodium aluminate stream. By substantially no longitudinal mixing we mean that there is little, if any, relative movement between the sodium aluminate stream and the seed hydrate subsequent to introduction of the seed hydrate into the system. This may be accomplished by introducing the seed alumina hydrate in the same direction in which the stream of sodium aluminate is moving and flowing the added seed alumina hydrate and the moving sodium aluminate streams in the same direction within a restricted channel, e.g., a closed pipeline circuit, so that they are moving concurrently with respect to one another at substantially the same speed and with substantially no backflow of the alumina hydrate against the sodium aluminate liquor or of the sodium aluminate liquor against the alumina hydrate.

After precipitation of the impure alumina hydrate containing iron and its separation from the sodium aluminate liquor, substantially pure alumina hydrate may then be precipitated from the remaining liquor. This subsequently precipitated alumina hydrate is thus of improved purity as a result of the first step or preliminary separation of the small amount of impure iron-containing hydrate from the sodium aluminate liquor. This separation of iron-containing alumina hydrate may be done simply by running the moving stream of sodium aluminate through a liquid cyclone, centrifuge, filter or the like. The alumina hydrate with entrapped iron and other impurities separated from the stream of sodium aluminate liquor may be in the form of a slurry. In the instance of a cyclone the overflow comprises the sodium aluminate liquor and the underflow most of the solids, including the alumina hydrate with its content of iron and other impurities.

According to our invention the precipitate or solids portion containing the iron and other impurities may be recycled, for example, as a slurry, to serve as additional seed as it joins the incoming stream of sodium aluminate liquor. As the seed alumina hydrate is recycled it will become increasingly contaminated with iron precipitated as iron oxide. To limit any decreased efficiency of operation which might otherwise result from this contamination of the seed and to prevent any undue amount of recontamination of aluminate liquor with iron by particles of contaminated alumina hydrate not separated from the sodium aluminate liquor, a portion of the contaminated recycled alumina hydrate may be bled off from the main stream and replaced with fresh seed alumina hydrate.

According to our process we introduce sufficient alumina hydrate seed to the flowing stream of sodium aluminate liquor to precipitate preferably not more than 10 grams per liter (g./l.) of iron-contaminated alumina hydrate in the solids which are preliminarily separated. In other words, the alumina hydrate which is continuously precipitated according to the invention so as to carry with it iron and other impurities preferably amounts to not more than 10 g./l. of the flowing stream of sodium aluminate liquor. That is, this 10 g./l. maximum of preliminary precipitated alumina hydrate, as we use the term, including the iron and other impurities which the alumina hydrate carries along with it when precipitated, is removed with most of the seed alumina, as only a minute amount of the seed is generally left in the aluminate liquor after the preliminary separation of the contaminated precipitated hydrate. This means that most of the alumina content of the sodium aluminate stream remains for precipitation as alumina hydrate of improved purity in a subsequent step involving seeding with alumina hydrate or addition of carbon dioxide, by well-known procedures.

The following example is illustrative of our invention.

To a stream of sodium aluminate liquor produced by digesting bauxite with sodium hydroxide, with the $Al_2O_3$:TC ratio adjusted to be within the range of 0.64:1 to 0.66:1, is added continuously an alumina hydrate seed in which the particles of alumina hydrate amount to from 3.1 to 8.7 m.$^2$ surface area per liter of solution being treated. At the start, that is, prior to seeding, the sodium aluminate liquor used averages about 0.01 g./l. iron calculated as $Fe_2O_3$. The sodium aluminate liquor to which the seed hydrate is continuously added is flowing continuously at a rate of about 19 liters per minute in a pipe so that there is substantially no longitudinal mixing of aluminate and hydrate. Average liquor holding time is about 10 to 20 minutes. A few preliminary runs are made in which the cyclone-separated, hydrate-containing slurry is not recycled. Then five runs are made, each of which is terminated about 100 to 120 minutes after beginning the recycling. In each of these runs addition of the alumina hydrate is discontinued when the second recycling of hydrate is begun and the alumina hydrate solids level becomes constant at the desired amount, viz, 100–300 grams of total hydrate per liter of sodium aluminate liquor, usually after about 20 to 30 minutes.

The concentration of alumina in the untreated sodium aluminate liquor is determined and the iron content of the precipitate measured by a quantometer. Alumina hydrate is precipitated from the purified sodium aluminate liquor remaining after separation of the precipitated iron-contaminated alumina hydrate in slurry form and the amount of the precipitate measured, its iron content (as $Fe_2O_3$) being calculated quantometrically (% by weight of the $Al_2O_3$). The results are reported in the following table, which also includes the temperature for each run.

| Run No. | Temp. (° F.) | Seed area [1] (m.²/l.) ($Al_2O_3$ used = 88–300 g./l.) | Iron-containing alumina hydrate precipitated (as $Al_2O_3$) (g./l.) | Untreated sodium aluminate liquor | Purified sodium aluminate liquor with purified alumina hydrate content |
|---|---|---|---|---|---|
| 1 | 160–170 | 8.49 | 1.3 | 0.026 | 0.004 |
| 2 | 190–200 | 8.66 | 2.3 | .024 | .005 |
| 3 | 190–200 | 7.17 | 2.7 | .012 | .001 |
| 4 | 190–200 | 3.07 | 0.4 | .014 | .005 |
| 5 | 190–200 | 0.05 | 1.5 | .024 | .005 |

[1] Surface areas were calculated from size distribution data of seed samples taken at end of run.

DESCRIPTION OF THE DRAWING

A better understanding of our invention may be had by reference to the drawing which forms a part hereof and which is a schematic diagram in flow sheet form indicating the steps involved in removing iron and other impurities from sodium aluminate liquor and forming alumina hydrate of improved purity according to our invention.

In the drawing, sodium aluminate feed liquor is passed in a flowing stream through line 10. A slurry of alumina hydrate seed is introduced from seed tank 12 to the flowing stream of sodium aluminate feed liquor via line 14. The seeded stream of sodium aluminate liquor passes through tube 16, which may be S-shaped, for example, of sufficient length and diameter that there is substantially no longitudinal mixing of seed with aluminate and that precipitation of alumina hydrate containing iron and other impurities results. The sodium aluminate liquor containing the iron-containing precipitated alumina hydrate passes next via line 18 to a separator 20, which may be of a liquid cyclone, centrifuge, or filter type. In the separator the purified sodium aluminate liquor is removed from the system at line 22 for precipitation of purified alumina hydrate by seeding or use of carbon dioxide, and the solids, principally alumina hydrate containing iron and other impurities, are removed via line 24 and reintroduced into the system by passing through seed tank 12, to which fresh alumina hydrate seed slurry may be introduced via line 26.

As explained above, to prevent excessive contamination of the sodium aluminate liquor passing through line 22 with iron, by particles not separated from the liquor, some of the alumina hydrate containing the iron and other contaminants may be bled off (via line 28) before the slurry of alumina hydrate containing iron and other impurities is reintroduced (via seed tank 12) to the sodium aluminate liquor passing continuously (through line 10).

According to our invention we have been able to reduce the iron content (calculated as $Fe_2O_3$) of alumina hydrate precipitated from sodium aluminate liquor from about 0.020 percent by weight based on the weight of calcined alumina product precipitated from the liquor to about 0.005 percent or less with use of a liquor-holding time at 150°–225° F. of as little as 10 to 15 minutes.

While the invention has been described in terms of preferred embodiments, the claims appended hereto are intended to encompass all embodiments which fall within the spirit of the invention.

Having thus described our invention and certain embodiments thereof, we claim:

1. A process for reducing the iron content of an undesirably high-iron, alumina-containing sodium aluminate liquor which comprises contacting alumina hydrate seed and a moving stream of said liquor with substantially no longitudinal mixing of liquor and seed at a sufficient seed surface area and for a relatively short liquor holding time sufficient to carry down a substantial amount of iron with alumina hydrate thereby precipitated from said stream.

2. The process of claim 1 wherein the alumina hydrate seed is in the form of a slurry.

3. The process of claim 1 wherein a temperature for the contacting is from about 150° F. to about 225° F.

4. The process of claim 1 wherein a temperature for contacting is from about 160° F. to about 200° F.

5. The process of claim 1 wherein the surface area of the seed is from about 3 square meters per liter to about 9 square meters per liter of said moving stream.

6. The process of claim 1 wherein the surface area of the seed is from about 1 square meter per liter to about 20 square meters per liter of said moving stream, the alumina content of the stream is such that the $Al_2O_3$ to total caustic ratio of the stream is from about 0.3:1 to about 0.8:1 and the liquor holding time is from about 5 minutes to about 30 minutes.

7. In a process for reducing the iron content of sodium aluminate liquor by seeding with alumina hydrate, the improvement which comprises contacting a moving stream of sodium aluminate liquor having an $Al_2O_3$:total caustic ratio of from about 0.3:1 to about 0.8:1 with sufficient alumina hydrate seed to provide a seed surface area of from about 1 square meter per liter to about 20 square meters per liter of said moving stream of sodium aluminate liquor for a liquor-holding time of from about 5 minutes to about 30 minutes, with substantially no longitudinal mixing of said sodium aluminate liquor with said alumina hydrate, thereby precipitating not more than about 10 grams of iron-containing alumina hydrate per liter of said stream of sodium aluminate, and separating a resulting stream of sodium aluminate of reduced iron content from the precipitated iron-containing alumina hydrate.

8. The improvement of claim 7 wherein the process is continuous, said contacting and separating being done continuously.

9. The improvement of claim 7 wherein the surface area of the alumina hydrate seed contacted with the moving stream of sodium aluminate liquor is from about 3 square meters per liter to about 10 square meters per liter of said moving stream of sodium aluminate liquor and the temperature of the moving stream of sodium aluminate liquor is from about 150° F. to about 225° F.

10. The improvement of claim 7 wherein the separating of the resulting stream of sodium aluminate liquor of reduced iron content from the precipitated iron-containing alumina hydrate is by liquid cyclone, centrifuge or filter.

11. The improvement of claim 7 wherein, after separating the stream of sodium aluminate of reduced iron content from the precipitated iron-containing alumina hydrate, alumina hydrate of improved purity is subsequently precipitated and separated from said resulting stream of sodium aluminate.

12. The improvement of claim 7 wherein the precipitated iron-containing alumina hydrate is recycled to form part of the alumina hydrate seed with which the stream of sodium aluminate liquor is contacted and a portion of the precipitated iron-containing alumina hydrate is separated from said iron-containing alumina hydrate being recycled and is replaced with fresh alumina hydrate seed.

13. In a process for production of alumina by precipitation of alumina hydrate from a sodium aluminate liquor derived from an alumina-bearing source, the improvement which comprises contacting a stream of iron-containing sodium aluminate liquor having an $Al_2O_3$ to total caustic ratio of from about 0.3:1 to about 0.8:1 for a holding time of from about 5 minutes to about 30 minutes and at a temperature of from about 150° F. to about 225° F. with sufficient alumina hydrate seed to provide a seed surface area of from about 1 square meter per liter to about 20 square meters per liter of said stream, said contacting being accomplished with substantially no longitudinal mixing of said sodium aluminate with said alumina hydrate, thereby precipitating iron-containing alumina hydrate from said stream of sodium aluminate liquor in an amount of not more than about 10 g./l. of said stream, separating said iron-containing alumina hydrate from said stream of sodium aluminate, recycling said iron-containing alumina hydrate to serve as additional seed for a further contacting and, in a separate step, precipitating alumina hydrate of improved purity and reduced iron content from said stream from which said iron-containing alumina hydrate has been separated.

14. The improvement of claim 13 wherein said surface area is from about 3 square meters per liter to about 9 square meters per liter of said stream and said temperature is from about 160° F. to about 200° F.

15. A process for reducing the iron content of sodium aluminate liquor which comprises conducting a stream of sodium aluminate liquor substantially unidirectionally, introducing alumina hydrate seed to said stream and moving same concurrently therewith at a rate of movement which is substantially the same as the rate of movement of said stream and with substantially no longitudinal mixing and substantially no backflow of the alumina hydrate against the sodium aluminate liquor, and separating resulting precipitated iron-containing alumina hydrate from said stream of sodium aluminate liquor, said stream of sodium aluminate liquor remaining after separation of said precipitated iron-containing alumina hydrate therefrom containing less iron than the original stream of sodium aluminate liquor to which the alumina hydrate seed is introduced.